United States Patent
Deb et al.

(10) Patent No.: US 9,577,411 B2
(45) Date of Patent: Feb. 21, 2017

(54) PLENUM ASSEMBLY

(71) Applicant: SCHNEIDER ELECTRIC INDUSTRIES SAS, Rueil Malmaison (FR)

(72) Inventors: Manan Deb, Bangalore (IN); F. Michael Page, Seneca, SC (US); Sinan Meric, Smyrna, TN (US); Ramesh Subramanyam, Bangalore (IN)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 196 days.

(21) Appl. No.: 13/972,977

(22) Filed: Aug. 22, 2013

(65) Prior Publication Data

US 2014/0118887 A1  May 1, 2014

(30) Foreign Application Priority Data

Oct. 26, 2012  (IN) .......................... 4472/CHE/2012

(51) Int. Cl.
*H02B 13/025* (2006.01)

(52) U.S. Cl.
CPC ................. *H02B 13/025* (2013.01)

(58) Field of Classification Search
CPC .......... H02B 13/025; H02B 1/28; H02B 1/56; H01H 33/02–33/08; H01H 9/047
USPC .................... 218/155–157; 361/622
See application file for complete search history.

(56) References Cited

U.S. PATENT DOCUMENTS

| | | | | |
|---|---|---|---|---|
| 667,149 A * | 1/1901 | Kenney | ................ | A62C 3/0207 126/271.2 A |
| 3,827,342 A * | 8/1974 | Hughes | ................... | F24F 7/065 422/4 |
| 4,357,860 A * | 11/1982 | Krzak | ..................... | B64F 1/305 138/120 |
| 4,543,677 A * | 10/1985 | Haglund | ................ | B64F 1/305 138/120 |
| 5,574,624 A * | 11/1996 | Rennie | ................ | H02B 13/025 200/289 |
| 5,710,402 A * | 1/1998 | Karnbach | ........... | H02B 13/025 218/157 |
| 6,003,814 A * | 12/1999 | Pike | ....................... | B64D 15/04 239/587.1 |
| 6,131,960 A * | 10/2000 | McHughs | .......... | F16L 27/1017 285/302 |
| 6,407,331 B1 * | 6/2002 | Smith | .................. | H02B 13/025 174/17 VA |
| 6,410,844 B1 * | 6/2002 | Bruner | ................ | H02B 13/025 174/17 VA |
| 6,417,443 B1 * | 7/2002 | Smith | .................. | H02B 1/565 174/17 VA |

(Continued)

FOREIGN PATENT DOCUMENTS

| | | |
|---|---|---|
| GB | 2345385 A | 7/2000 |
| WO | 2012/008809 A2 | 1/2012 |
| WO | 2012/088009 A1 | 6/2012 |

*Primary Examiner* — Zachary M Pape
(74) *Attorney, Agent, or Firm* — Mark M. Friedman

(57) ABSTRACT

The present invention provides for a plenum assembly coupled to an arc resistant cabinet, the plenum assembly comprising of individual modules coupled in a telescopic manner. Each module encloses a chamber to form a central conduit for exhaust products generated from the electrical equipment. The plenum assembly further comprises of a resilient deflector plates angularly prescribed to horizontal plane M-N which manages the direction of gas flow inside the plenum so that the hot gases are diverted to the outside of the building.

15 Claims, 19 Drawing Sheets

(56) References Cited

U.S. PATENT DOCUMENTS

| | | | | |
|---|---|---|---|---|
| 6,512,669 B1 * | 1/2003 | Goodwin | ............ | H02B 13/025 200/50.12 |
| 6,669,552 B1 * | 12/2003 | Beer | ........................ | E21F 1/04 454/171 |
| 7,054,143 B2 * | 5/2006 | Eiselt | ................... | H02B 13/025 218/155 |
| 7,576,985 B2 * | 8/2009 | Kingston | ............. | H02B 13/025 165/104.33 |
| D651,982 S * | 1/2012 | Karandikar | ................... | D13/158 |
| 8,101,881 B2 * | 1/2012 | Miller | .................. | H02B 13/025 218/157 |
| 8,242,395 B2 * | 8/2012 | Josten | .................. | H02B 13/025 200/306 |
| 8,785,770 B2 * | 7/2014 | Gingrich | ................ | H02B 1/565 174/17 VA |
| 8,791,361 B2 * | 7/2014 | Gingrich | ................ | H02B 1/565 174/17 VA |
| 2003/0116413 A1 * | 6/2003 | Narusevicius | ......... | H01H 9/104 200/50.21 |
| 2003/0117045 A1 * | 6/2003 | Byron | .................... | H01H 31/12 312/199 |
| 2009/0141432 A1 * | 6/2009 | Kingston | ............. | H02B 13/025 361/676 |
| 2010/0258532 A1 * | 10/2010 | Miller | .................. | H02B 13/025 218/157 |
| 2011/0019362 A1 * | 1/2011 | Krietzman | ......... | H05K 7/20736 361/690 |
| 2011/0299228 A1 * | 12/2011 | Milovac | ................ | H02B 11/26 361/614 |
| 2015/0036310 A1 * | 2/2015 | Karandikar | .......... | H02B 13/025 361/837 |

* cited by examiner

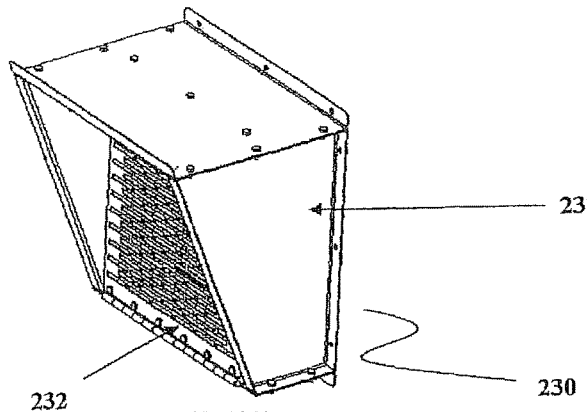
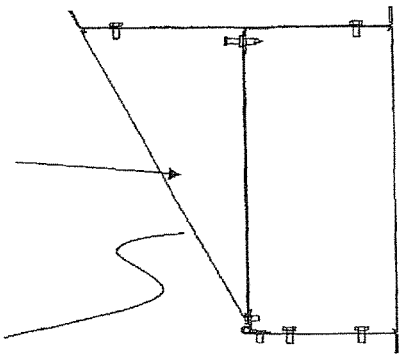
FIGURE 7a
FIGURE 7b
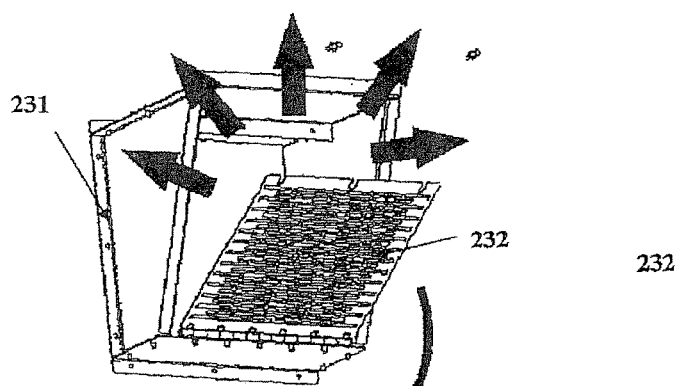
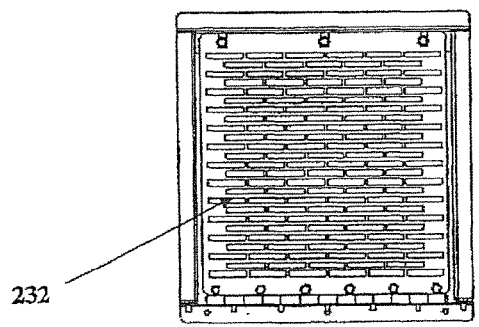
FIGURE 7c
FIGURE 7d
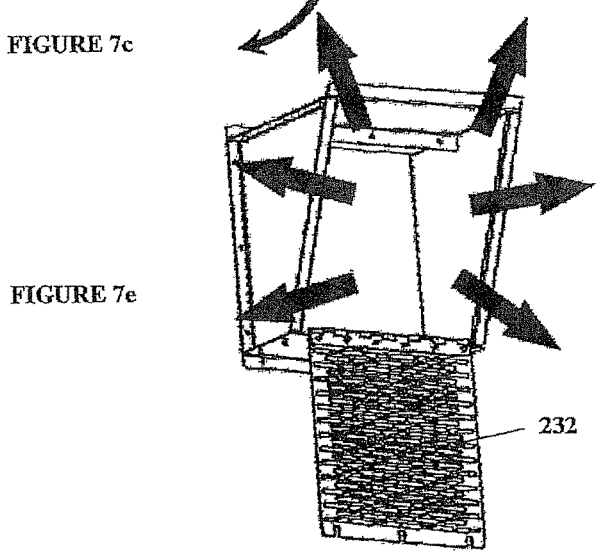
FIGURE 7e

PLENUM ASSEMBLY

TECHNICAL FIELD

The present invention relates to a plenum assembly for arc resistant cabinets housing electrical equipments, adapted to manage exhaust products emanating from the electrical equipments during au incident of internal. Arc by deflecting the exhaust products away from the said equipments and providing personnel safety. More particularly, the present invention relates to the plenum assembly for managing exhaust products emanated in arc resistant cabinet to avoid secondary faults and safe and efficient removal of exhaust product from the area enclosing the arc resistant cabinet.

BACKGROUND AND PRIOR ART

Electrical equipments such as arc resistant switchgears are usually designed to withstand the pressures and temperatures of gases associated with an internal arcing fault. For this purpose, they are equipped with exhaust chambers or plenums which channel exhaust products such as hot gases, debris and metal parts away from the room where the arcing electrical equipment and handling personnel are present.

Usually a plenum assembly provided on top of the switchgear so that the hot gases flow out through the plenum and to outside of the building through the opening provided in the wall. Many-a-times, there exists a clearance distance between the opening of the wall and the plenum assembly termination and the clearance distance varies at various different locations depending on the distance of the wall form the switchgear. Considering that commonly available plenums are of standard lengths, such clearances could result in a gap creating an escape route for hot gases within the building itself which can lead to serious consequences during an arc flash. At present, the only available method to avoid such clearances is to make plenum of customized length as per requirement.

The occurrence of arcing inside electrical switchgear has many undesirable results. The arc energy can cause a sudden pressure increase inside the enclosure resulting in severe mechanical and thermal stress on the equipment and its panel parts. As arcing begins, gases inside the switchgear ionize. The ionization reduces the ability of air inside the switchgear to provide its previous insulative capabilities, and the ions generated by the degradation of the air molecules inside the switchgear cause the air to more readily conduct electricity leading to arc flashes. An arc flash is a phenomenon in which large amounts of light and waves of heat energy are released explosively from electrical equipment. The electric arcs produced by these sources jump anywhere from a few inches to several feet, depending on the voltage level involved and can result in an explosion with a shockwave. If an individual is nearby the unit where are flash occurs, they can be seriously injured, if not killed. Since the human body is a great conductor of electricity, the are travels through human body literally seeking ground resulting in severe injuries.

In case of switchgears having more than one vertical section, there is a possibility of occurrence of secondary fault. An electrical arc contains conducting ions. When this arc travels outside the electrical equipment it can pass through a healthy busbar section usually to the adjacent vertical section. This can cause another fault known as secondary fault which may be more severe than the first arc fault. For example as seen in FIG. 1, which depicts a switchgear 10 comprising vertical sections 11, 12 and 13 and having a plenum 15, in which a fault 14 occurs in section 12. The arc travels out of section 12 through the roof 17 and enters into section 11 to create secondary fault 16. Similarly, the secondary fault can occur in more sections.

Presently available prior art solutions provide arc resistant cabinets which typically include a frame having a hinged flap assembly which open to relieve the pressure inside the cabinet when an arc occurs. In U.S. Pat. No. 6,407,331, as depicted herein in FIG. 2A a pressure release panel 36 is provided for use with arc resistant cabinets. The pressure relief panel 36 includes at least one flap 38 defined by a plurality of cuts 40 within the panel. The patent further describes that during normal operation of the circuit breaker, the flaps remain closed (FIG. 2A). In the event of arcing, as seen in FIG. 2B the flaps open to approximately vertical position by the high pressure expanding gases.

Another prior art, WO2012/088009 describes a vent flap member which opens vertically to permit gases into the opening into the arc chamber. Referring to FIG. 2C depicting the binge assembly of this prior art where each flap 42 is hinged at the junction of the housing and a bottom edge of the flap 42 via two overlapping members. The flaps 42 define at least one detent opening 47 and the flaps 42 are affixed to a surface, of the housing, which has no detent opening. The detent openings of the flaps 42, received the knuckle of the hinge 53 that interlocks with at least one pin structure 51 to form the hinge structure 46. This hinge structure 46 allows the flaps 42 to lay flat generally sealing against the housing surface in both directions of rotation about this hinge structure 52 when in closed position thereof.

Therefore, in actuality, the flap door is typically forced open due to the force of high pressure expanding gases generated during arcing. This delay in release of exhaust material caused due to delay in opening of flap door can lead to the metal housing of the cubical to burn through. While it is apparent that the problem associated with arcing in electrical switchgear has been recognized, it is also readily apparent that the need continues to exist for arc resistant switchgear. Attempts have focused on lessening the chance of an arc occurring, but when it occurs, the only way to minimize it quickly is by providing for the safe exhaust of hot gases. Existing methods have not adequately solved the problem. Accordingly, there is a need for an arc resistant cabinet having means for directing high temperature, expanding gases away from the cabinet whereby said means do not suffer from delay in opening and thus release of hot gases. There is also a need for providing a plenum having means to direct the hot exhaust gases from the arcing section away from the other non-arcing sections to avoid secondary fault. And a further need is felt to provide for a plenum assembly where the exhaust gases are thrown out of the area enclosing said arc resistant cabinet efficiently and safely and without causing any leakage there within.

SUMMARY OF THE INVENTION

The present invention provides for a plenum assembly for an arc resistant cabinet, the plenum assembly comprising individual modules coupled in a telescopic manner. Each module encloses a chamber leading to an exhaust conduit for deflecting of exhaust products generated from the electrical equipment. The plenum assembly further comprises of resilient deflector plates angularly prescribed to horizontal plane M-N during normal unarcing conditions.

BRIEF DESCRIPTION OF THE DRAWINGS

A full understanding of the invention can be gained from the following description of the preferred embodiments when read in conjunction with the accompanying drawings in which:

FIGS. 7A to 7E show terminal assembly and its parts thereof.

DETAILED DESCRIPTION OF THE INVENTION

Figure 1:
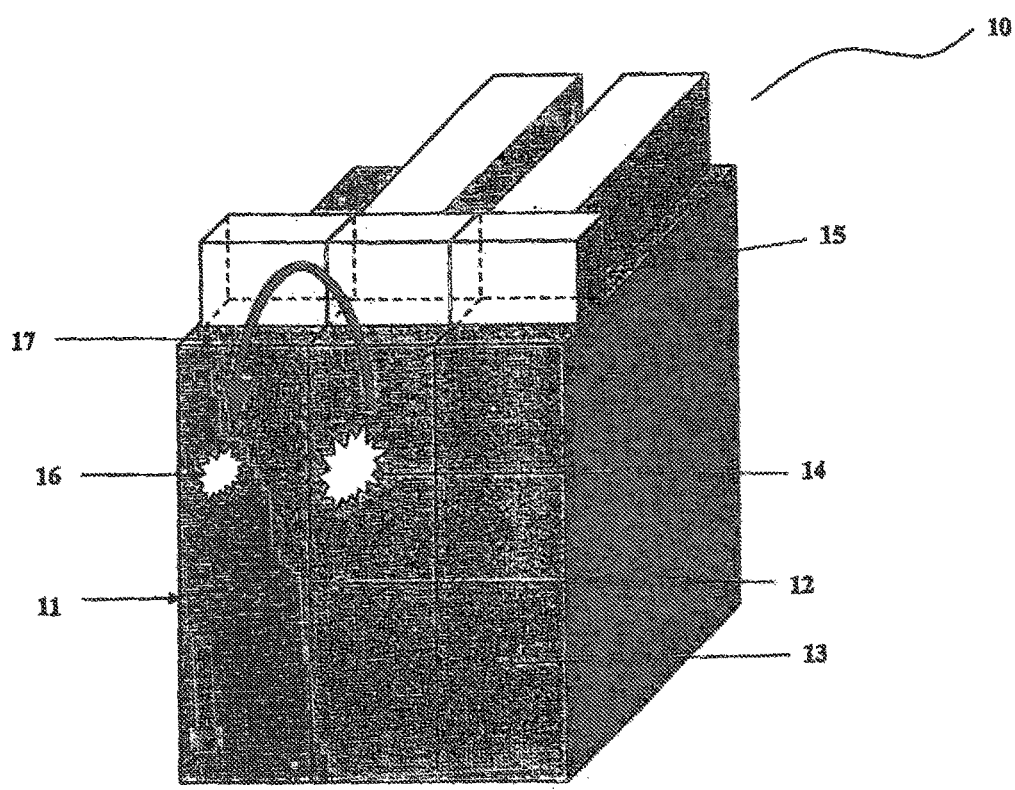
FIG. 1 represents an arc resistant cabinet having multiple vertical sections showing occurrence of secondary fault.
Figure 2A:
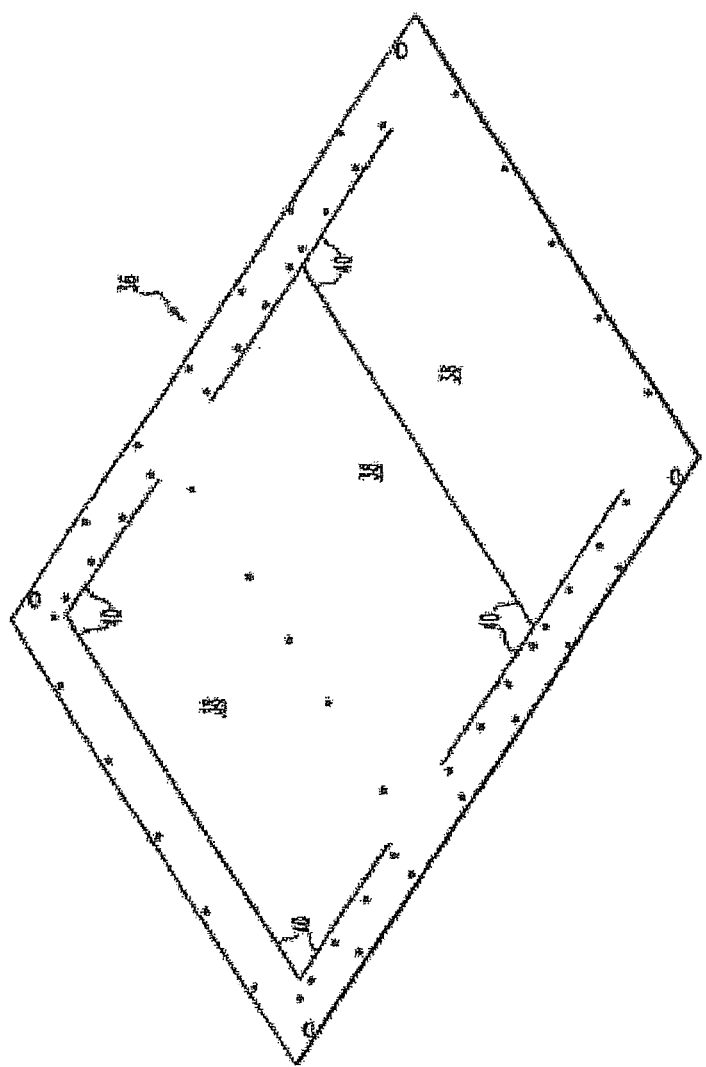
FIGS. 2A and 2B depict the ventilation assembly described in prior art U.S. Pat. No. 6,407,331
Figure 2B:
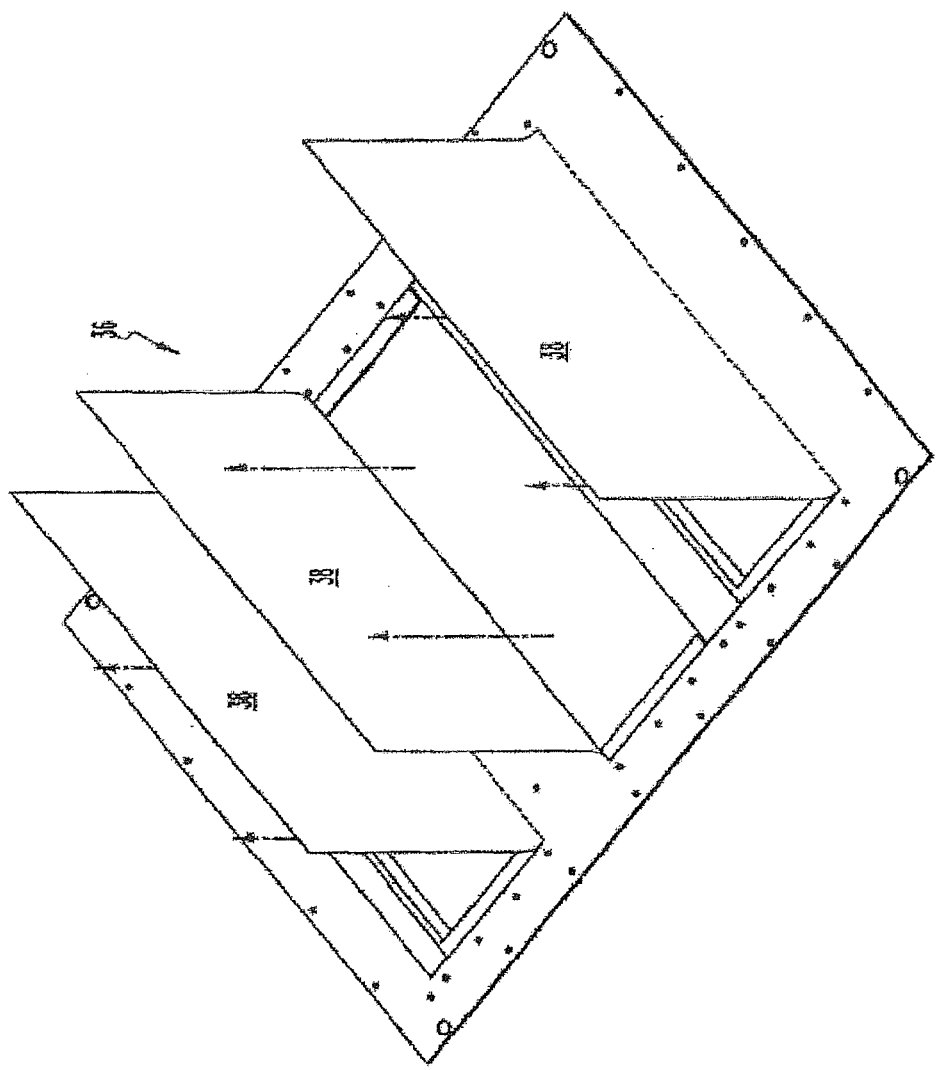
Figure 2C:
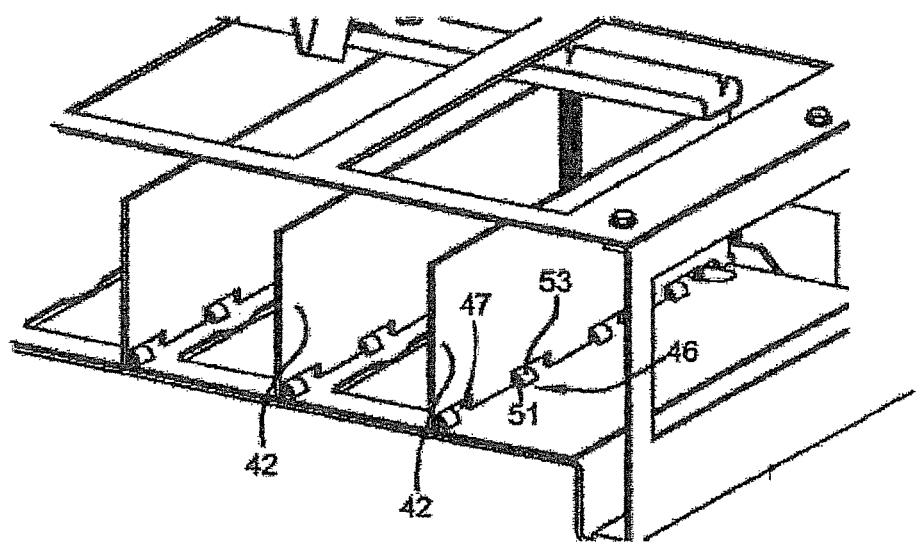
FIG. 2C depicts the ventilation assembly of prior art WO 2012/088009

For the purposes of illustrations, embodiments of the invention will be described as applied to arc-resistant cabinets, although it will become apparent that they could also be applied to a wide variety of electrical switching apparatus without limitation e.g. any enclosure of circuit switching devices and other circuit interrupters, such as motor starter enclosure, motor control centre and other load control centre, switchgears, switchboard or any type of electrical cabinet.

Directional phrases used herein, such as, for example, 'left', 'right', 'top', 'bottom', 'upper', 'lower', 'front', 'back', 'inner', 'outer', and derivatives thereof, relate to the orientation of the elements shown in the drawings and are not limiting upon the claims unless expressly recited therein.

As employed herein, the term, 'fastener' shall mean a separate element or elements which is/are employed to connect or tighten two or more components together, and expressly includes, without limitation, rivets, pins, screws, bolts and the combination of bolts and nuts (e.g.; without limitation, lock nuts) and bolts, washers and nuts.

As employed herein, the statement that two or more parts are 'coupled' together shall mean that the parts are joined either directly or joined through one or more intermediate parts.

As employed herein, the term, 'number' shall mean one or an integer greater than one (i.e. a plurality)

The present invention attempts to solve the problems associated with the current state of the art to ensure that there is no delay in directing of exhaust products emanating in arc resistant cabinet into the associated plenum assembly and finally away from the area enclosing the said cabinet. A plenum assembly is coupled to an arc resistant cabinet for managing exhaust products generated from an arc resistant cabinet. The present invention provides for a plenum assembly having at least two modules. It is pertinent to note that number of modules depends on the length of plenum, distance to outlet wall from the enclosure enclosing the cabinet, rating of electrical equipment, location of electrical equipment and personnel and such other factors. The arc resistant cabinets of the present invention include at least two vertical sections housing at least one electrical equipment.

Figures 11A, 11B:
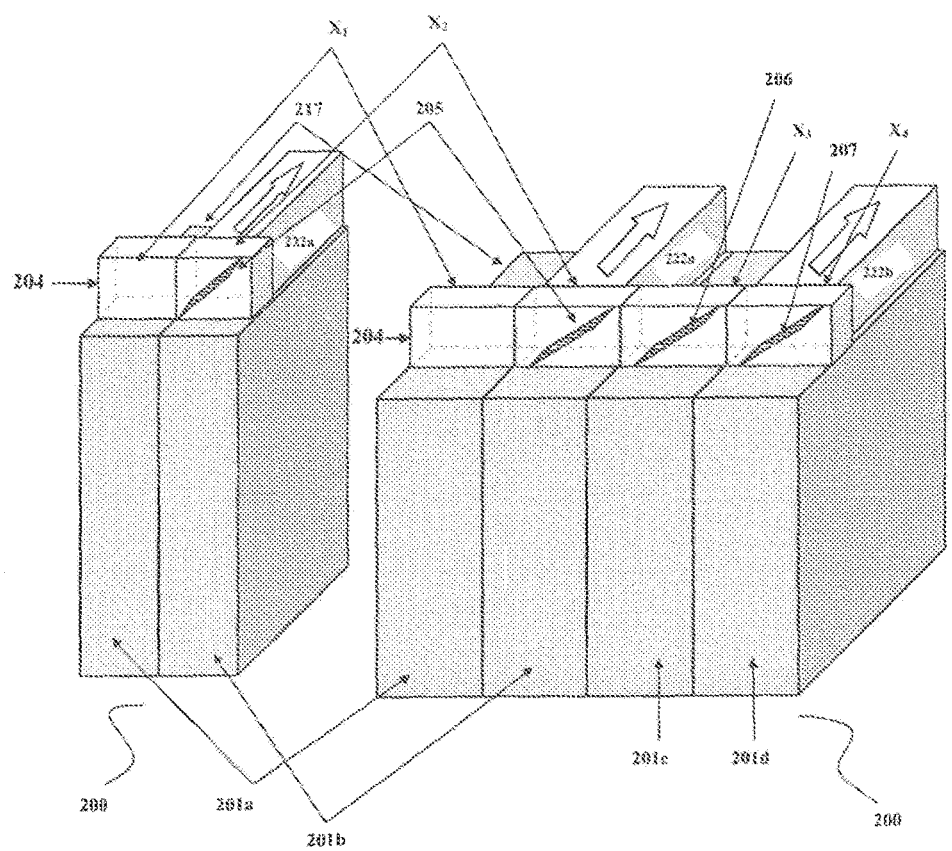
FIGS. 11A to 11D illustrate various embodiments of arc resistant cabinet and different exhaust configurations of associated plenum assembly.
Figure 11C:
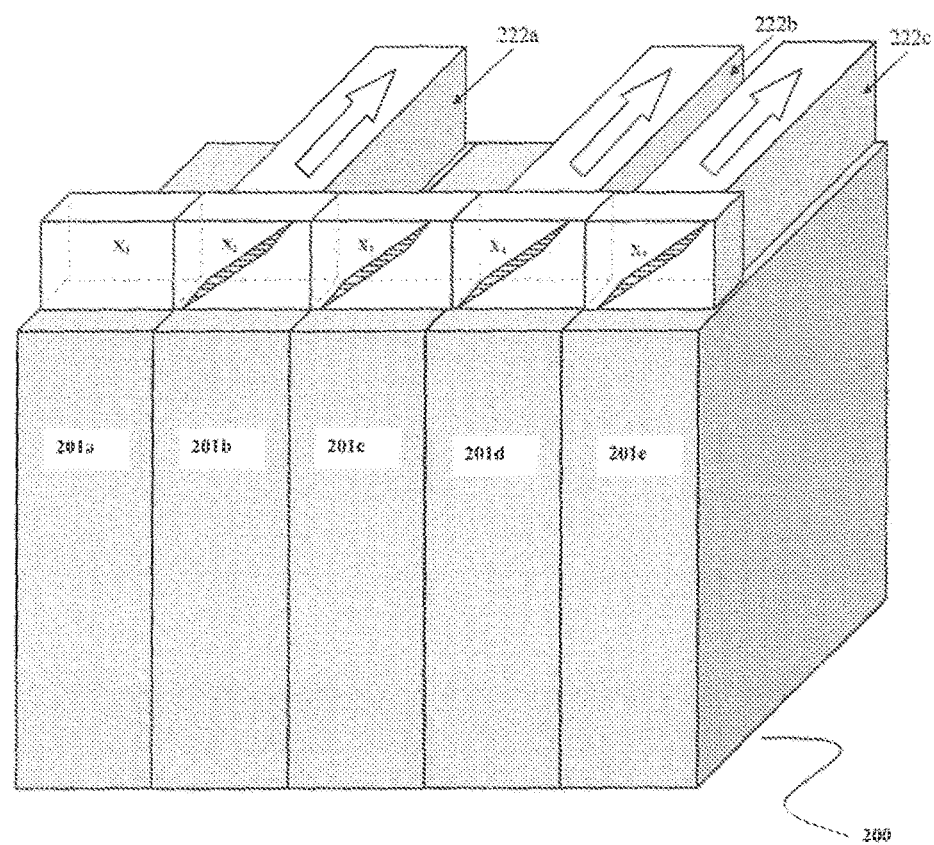
Figure 11D:
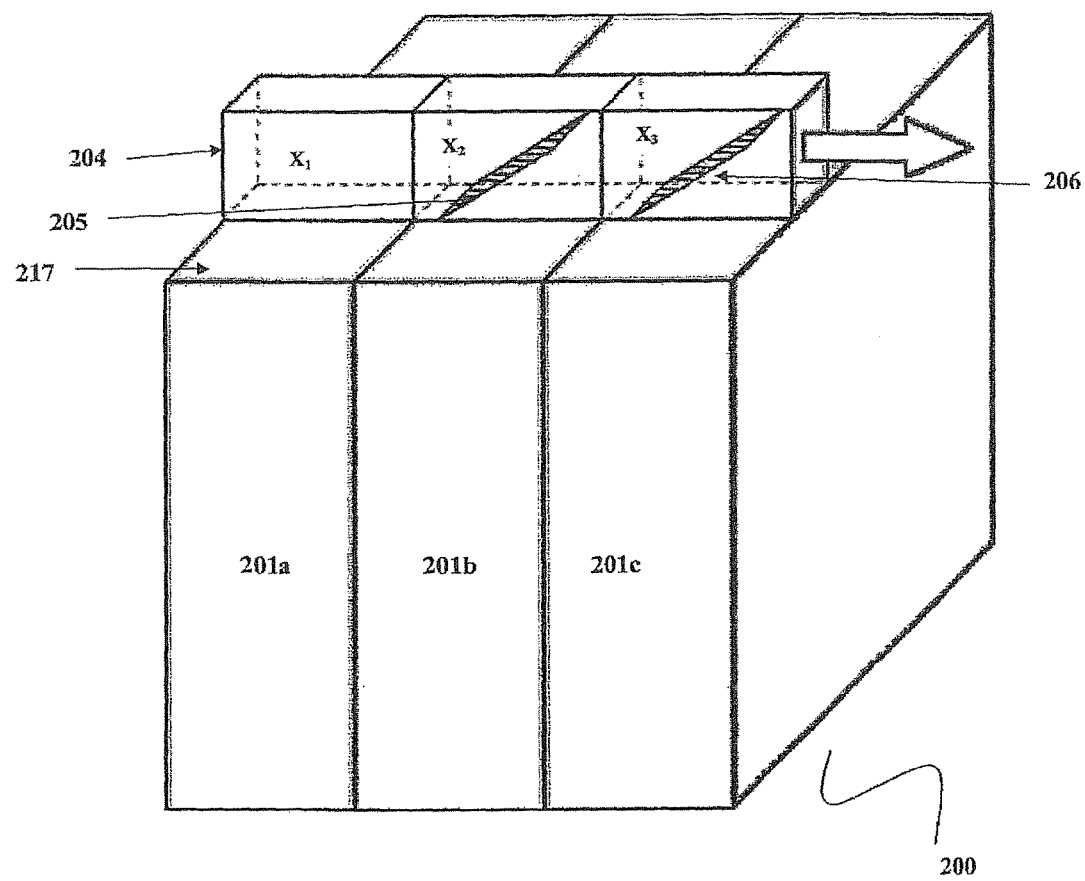

The number of vertical sections, electrical equipments comprised within the said cabinet, the exhaust conduits adjacent to each vertical section, number of deflector plates and such other features may be suitably modified based on requirement. As seen in FIG. 11A, in one embodiment, the arc resistant cabinet 200 includes two vertical sections (201a, 201b) coupled to a plenum assembly 204 having one exhaust conduit 222a. Another embodiment seen in FIG. 11B where the arc resistant cabinet 200 includes four vertical sections (201a, 201b, 201c, 201d) and the cabinet is coupled to a plenum assembly 204 having two exhaust conduits (222a, 222b). In yet another embodiment illustrated in FIG. 11C where the arc resistant cabinet 200 has five vertical sections (201a, 201b, 201c, 201d, 201e) in which there are three exhaust conduits (222a, 222b, 222c). It is realized that for higher level of fault more number of exhaust conduits are required. For example for a fault of the level of 100KA for 500 milliseconds, one exhaust conduit for every two vertical sections is required. In a further embodiment, the plenum assembly is configured to have rear exhaust as seen in FIGS. 11A, 11B and 11C or alternately a lateral exhaust as seen in FIG. 11D.

Figure 3A:
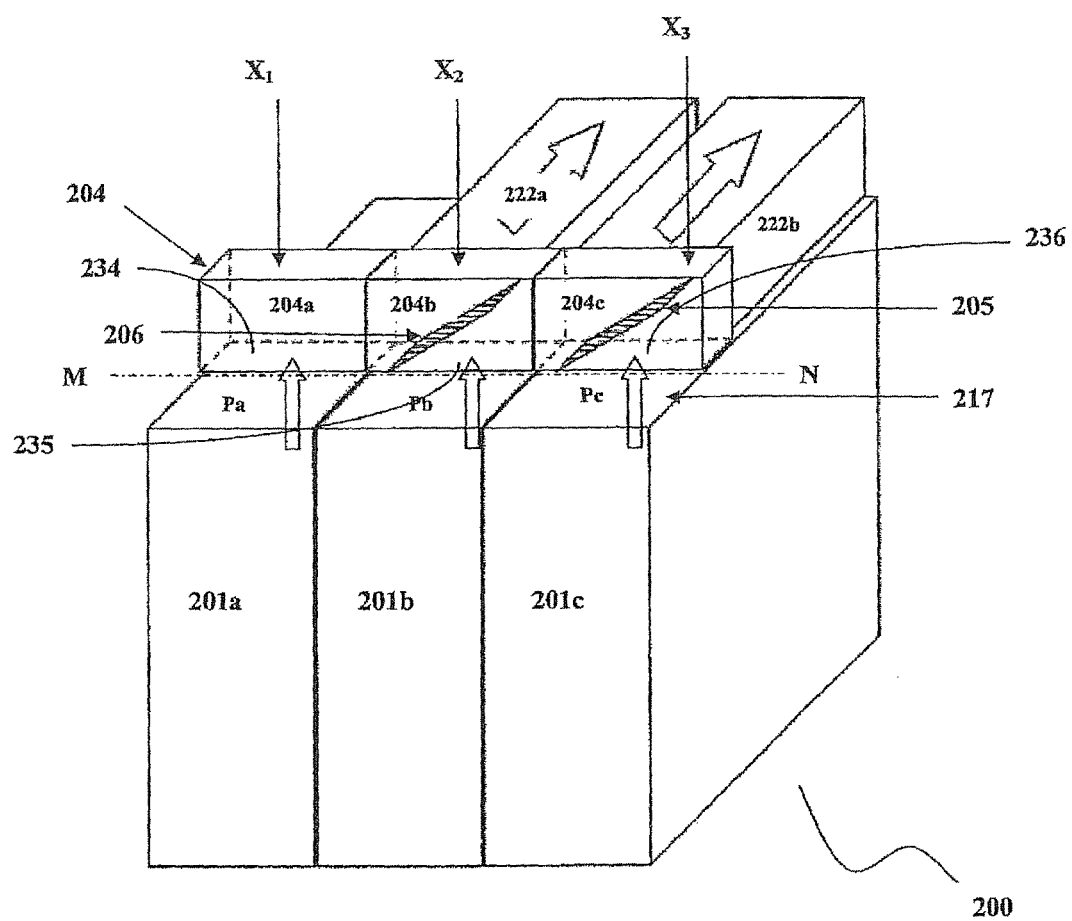
FIGS. 3A and 3B illustrates the plenum assembly including the deflector plates of the present invention during normal unarcing conditions.
Figure 3B:
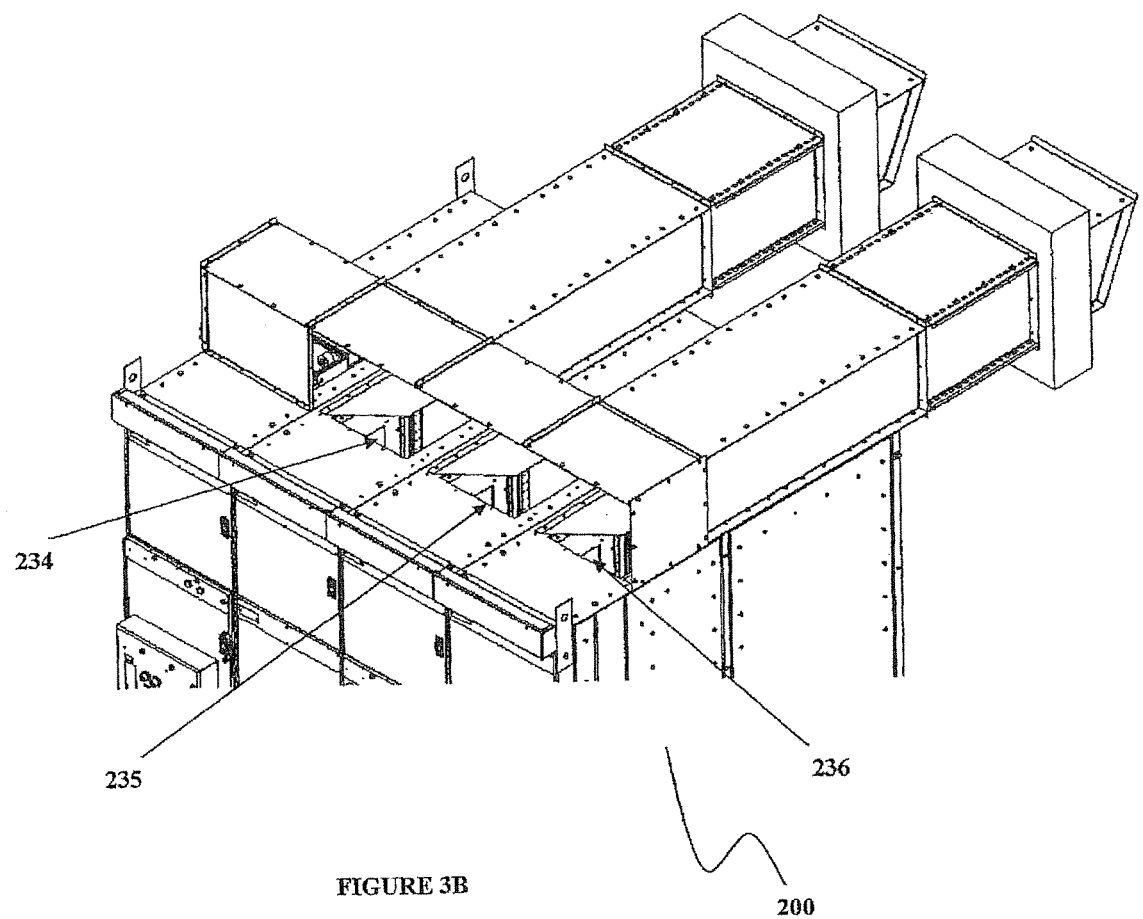
Figure 9:
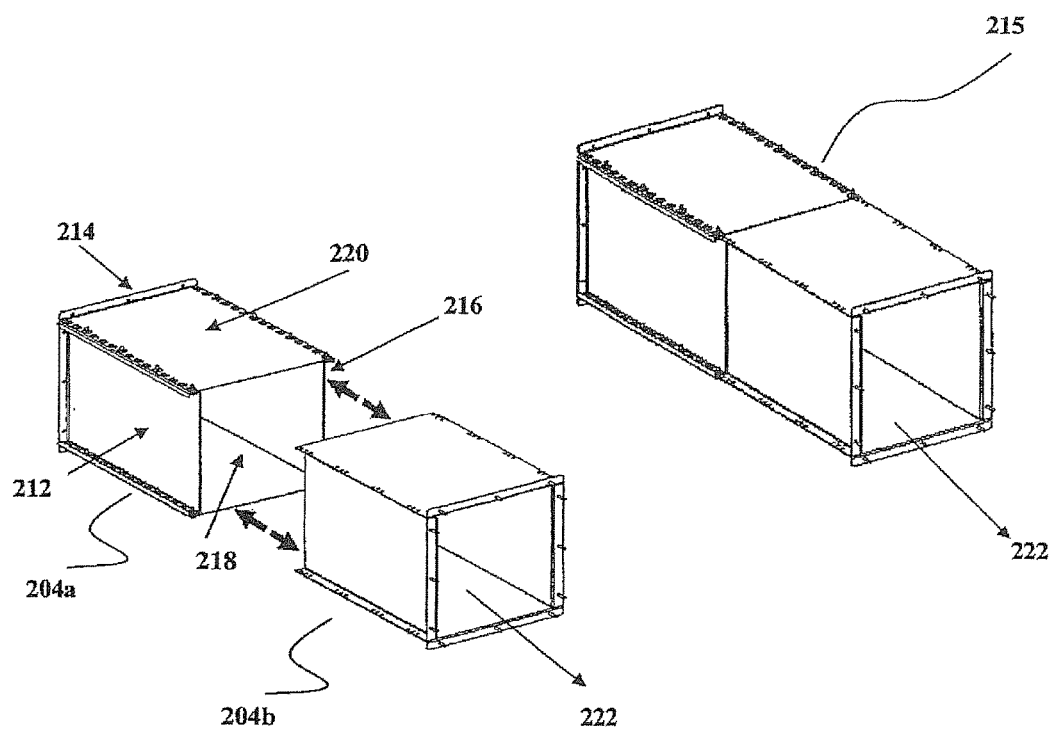
FIG. 9 depicts the assembly of modules to form telescopic plenum assembly of the invention FIG. 10A to 10E exemplify the working of telescopic plenum to prevent formation of leaks or gaps in the plenum assembly.

The present invention is explained herein with an embodiment where an arc resistant cabinet 200 has three vertical sections namely (201a, 201b, 201c) and two exhaust conduits (222a, 222b) in a rear exhaust configuration. In the embodiment seen in FIGS. 3A and 3B, the plenum assembly 204 for managing exhaust products generated from electrical equipments comprised within an arc resistant cabinet 200 enclosed in an area and which is coupled to said cabinet 200. The assembly comprises three modules ($X_1$, $X_2$, $X_3$) each having plurality of sides (212, 214, 216, 218, 220) enclosing chambers (204a, 204b, 204c) there within (FIG. 9). An opening is provided at bottom 218 of the chamber (204a, 204b, 204c) which is in fluid communication with at least one aperture (234, 235, 236) present on roof 217 of the cabinet 200 forming passageway (Pa, Pb, Pc) for deflection of exhaust products.

The plenum assembly comprises at least two resilient deflector plate (205, 206) present adjacent to the passageway (Pa, Pb, Pc) such that the resilient deflector plate is disposed angularly to plane M-N during normal unarcing conditions. The angle of disposition of the resilient deflector plates (205, 206) during normal unarcing conditions is around 30-60 degrees with respect to plane M-N. Thus during unarcing conditions, the passageway (Pa, Pb, Pc) is rendered partially open for thermal ventilation. The deflector plates (205, 206) are made of resilient products such as thin sheet metal, mild steel and the like which impart the required resiliency. In the event of an arc flash, the deflector plate shifts in response to emanated high pressure exhaust gases from the normal angular position to horizontal or vertical position thus preventing the arc flash generated in one vertical section (201a, 201b, 201c) from jumping into the adjacent vertical section (201a, 201b, 201c) by passing through roof 217.

Figure 4A:
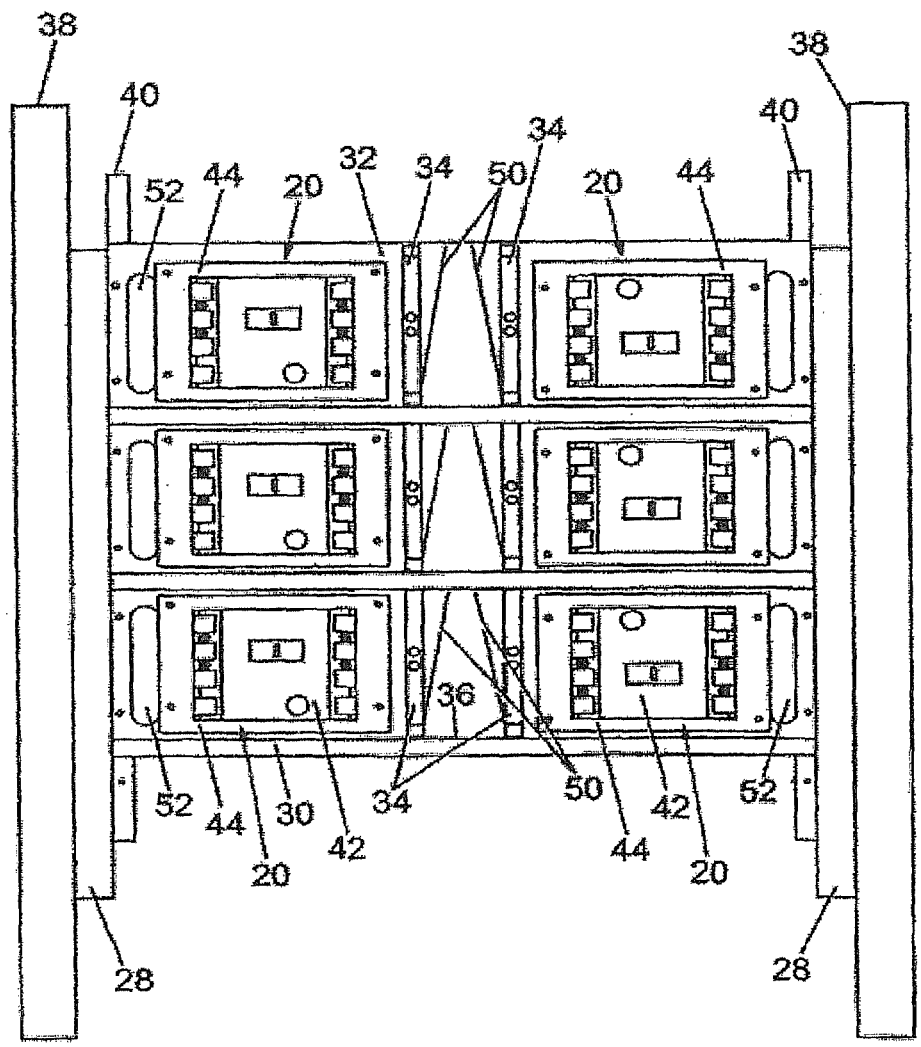
FIGS. 4A and 4B depict the ventilation assembly including flap members of prior art GB 2 345 385 during normal conditions and conditions when short-circuit has occurred.
Figure 4B:
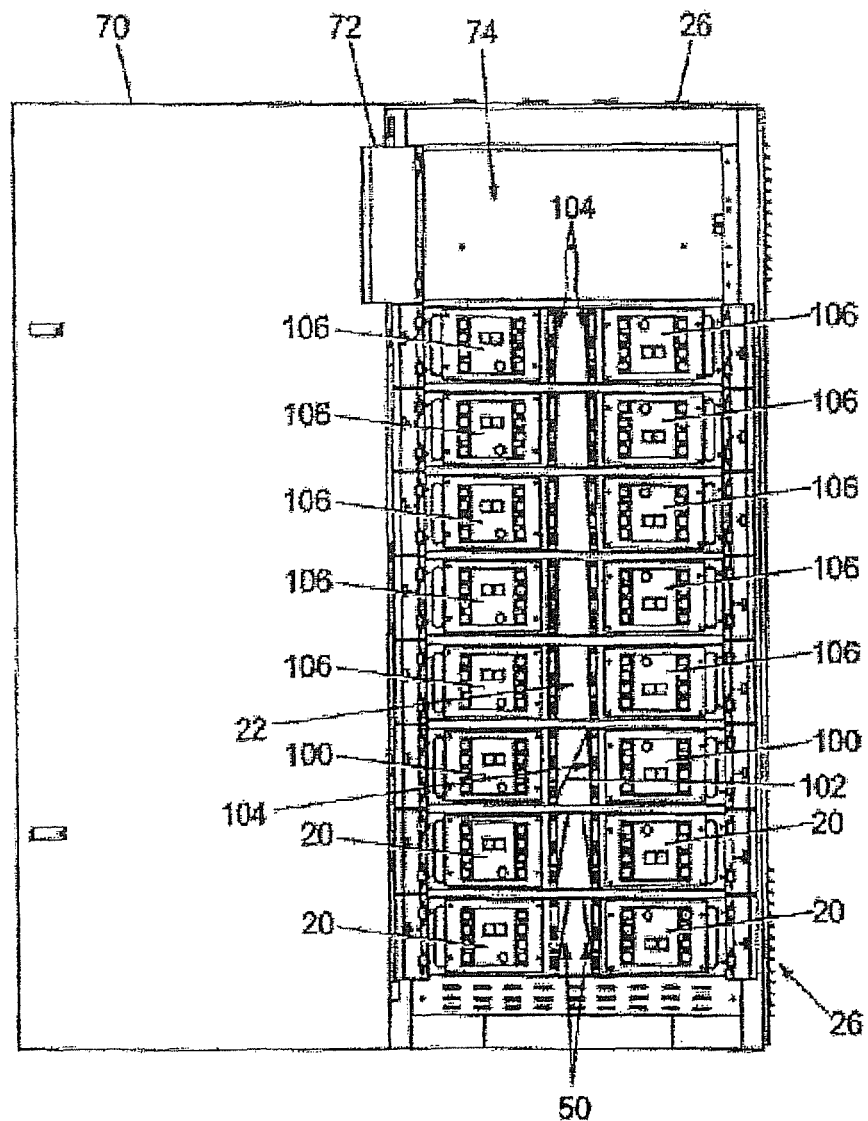

Inclined flaps have been seen in prior art document GB2 345 385 which describes an electrical switchgear having a flap member 50 which are secured along their lower edges to the inner vertical members 34 such that they extend upwardly and inwardly into the communal passage as seen in FIG. 4A herein. This patent document further describes with reference to FIG. 4B as incorporated herein, that in the event of short circuit in compartment 100, it causes flap 102 to deflect outward into communal passage 22. The blast of ionized air which issue outwards from compartment 100 via the flap 102 results in other flaps 104 above and opposite the fault compartment 100 being deflected towards vertically extending members 34. This seals off other compartments 106 and prevents generation of short circuits in other compartments.

However, it is noted that this prior art is specifically used for equipments where faults such as short circuits are likely to occur. Therefore according to this prior art the flaps are designed to allow only short circuit gases to come out from each of the circuit breaker chamber. Normally a short circuit generates very less amount of gas and the severity is much lesser than an internal arc fault. However, the present invention is designed for internal arc gases and deals with much higher gas pressure (approx. 10-15 psi) as compared to a short circuit gas generation. Whereas the flexible deflector plates of the instant invention control the gases coming out of from the entire vertical section which houses several electrical equipments. In addition, the flexible deflector plate also manages the direction of gas flow inside the entire plenum so that the hot gases are diverted to the outside of the building.

Figure 6:
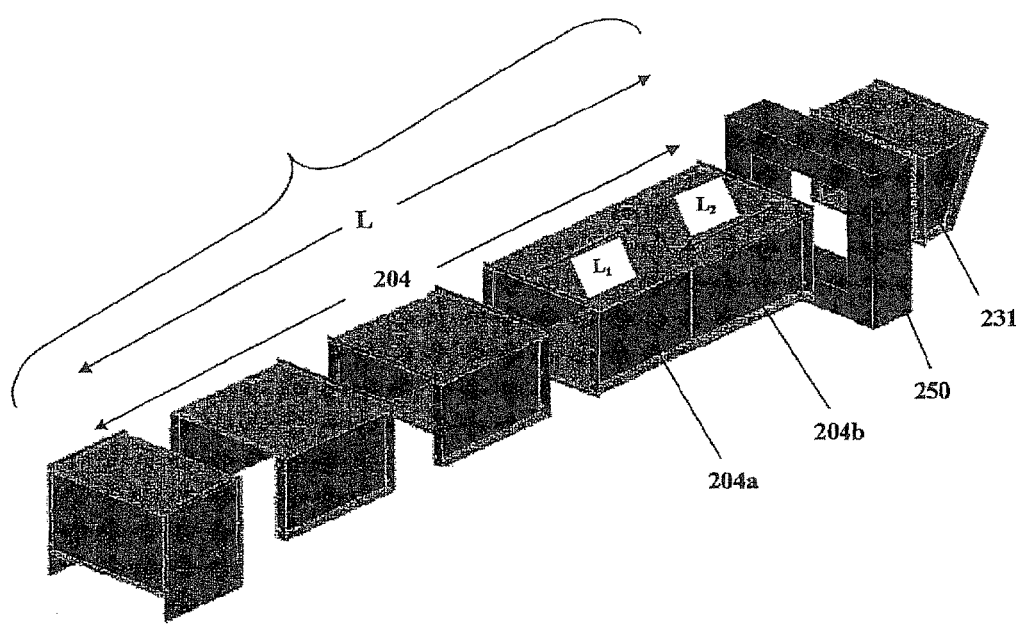
FIG. 6 represents the various parts of plenum assembly including the terminal assembly.
Figure 8:
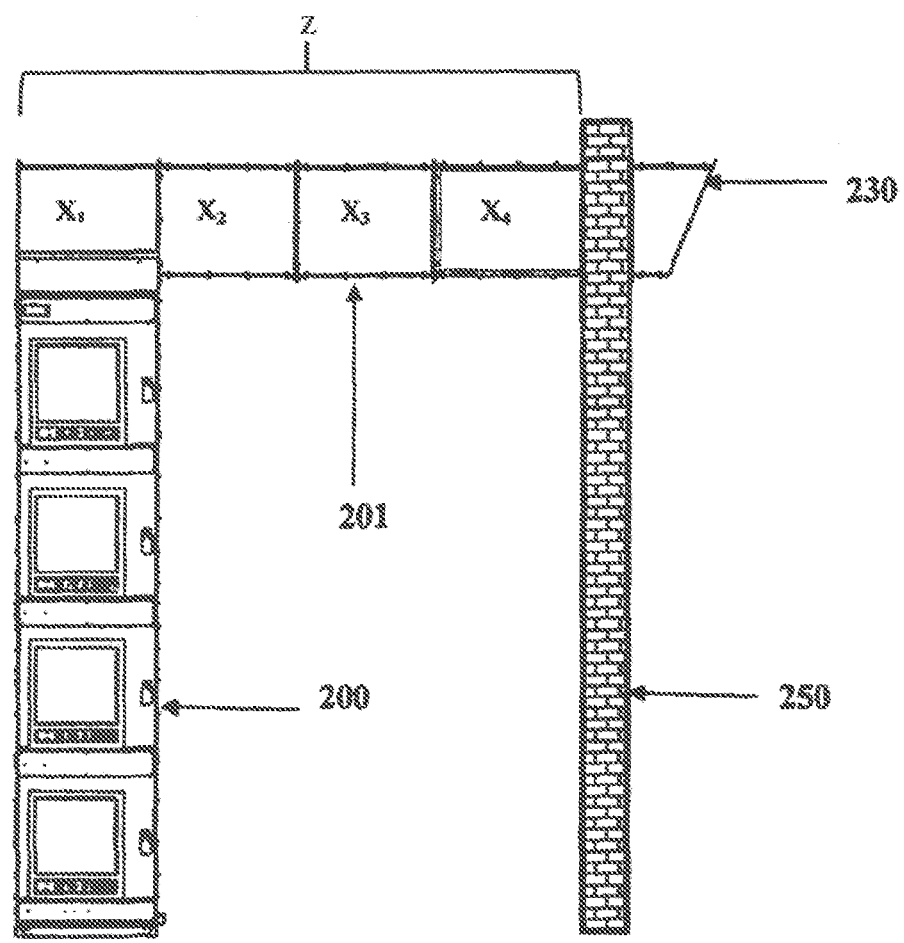
FIG. 8 illustrate the position of the terminal assembly in the plenum assembly.

The vertical sections (201a, 201b, 201c) open into the passageway (Pa, Pb, Pc) leading to the chamber (204a, 204b, 204c) adjacent to that passageway. Each chamber is connected with an exhaust conduit (222a, 222b) each conduit leading to terminal assembly 230 for deflection of exhaust products out of the area enclosing the cabinet 200. As seen in FIGS. 6 and 8, the terminal assembly 230 comprises of a terminal module 231 which is situated exterior to outlet wall 250 of the building enclosing the said cabinet 200. The terminal module is fitted with filter plate 232 for preventing entry of rodents, dirt, birds, insects and such other undesired elements which may be harmful to the plenum assembly or block the smooth passageway of exhaust products but allowing thermal ventilation to the cabinet in healthy working condition. The filter plate 232 is forced open completely due to the force of high pressure expanding gases generated dining an event of arc flash as shown in the FIGS. 7c and 7e. This provides more opening area and allows fast release of exhaust gases generated due to arcing.

In case of a rear exhaust configuration, each chamber (204a, 204b, 204c) is connected with an exhaust conduit (222a, 222b) and each conduit leads to its own terminal assembly 230 for deflection of exhaust products out of the area enclosing the cabinet 200. Therefore, the number of terminal assemblies 230 is equal to the number of exhaust conduits (222a, 222b).

In an alternate embodiment for a rear exhaust configuration, each exhaust conduit (222a, 222b) merges into a central exhaust conduit 222 leading to one terminal assembly 230 positioned outside the outlet wall 250. In a further embodiment, the modules ($X_1$, $X_2$, $X_3$) are arranged in lateral exhaust configuration in which case the chamber (204a, 204b, 204c) forms a central conduit 222 in conjunction with the chamber of adjacent module ($X_1$, $X_2$, $X_3$) leading to terminal assembly 230 for deflection of exhaust products out of the area enclosing the cabinet 200.

Referring to 7A to 7E, the terminal assembly 230 comprises of the terminal module 231 is fitted with a filter plate 232 (FIG. 7A). FIGS. 7B and 7C depict expanded representations of terminal module 231 and filter plate 232 respectively. During arcing the filter plate 232 opens in response to high pressure exhaust gases to allow discharge of the exhaust products as seen in FIGS. 7D and 7E. During normal unarcing conditions, the filter plate 232 remains fastened to the terminal module 231 and allow thermal ventilation of the arc resistant cabinet 200. It also aids in maintenance of plenum assembly 204.

The plenum assembly 204 of the present invention is telescopic in nature. Therefore, the modules ($X_1$, $X_2$, $X_3$) are connected such that each module ($X_1$, $X_2$, $X_3$) is slidingly fitted in its preceding module ($X_1$, $X_2$, $X_3$). Therefore, as seen in FIG. 6 several modules fitted in a manner that they have a concentric axis while differing in diameter enabling formation of telescopic conduit. The modules are coupled to each other with suitable means such as fasteners.

The telescopic modules ($X_1$, $X_2$, $X_3$) allow the plenum 204 to be extended to the outlet wall 250 of the area where the arc resistant cabinets are placed irrespective of the distance of the cabinet from the outlet wall 250. Therefore the present invention allows covering any distance with high precision without leaving any gaps through which the hot gases may leak out leading to a catastrophe. The telescopic plenum assembly also ensures that all exhaust products is thrown out of area efficiently and safely.

Figure 10A:
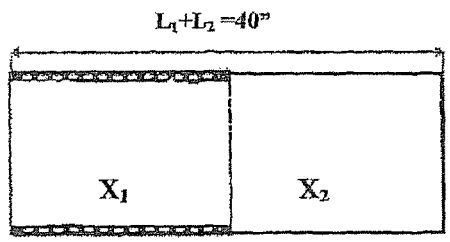
Figure 10B:
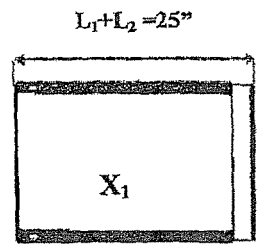
Figure 10C:
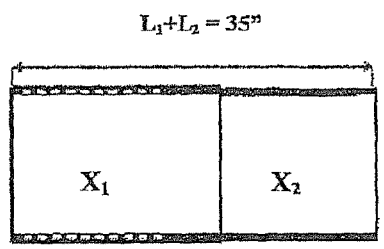
Figure 10D:
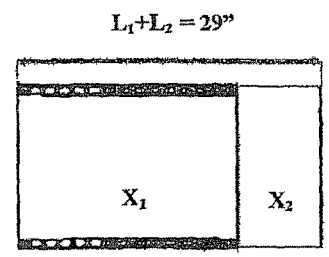
Figure 10E:
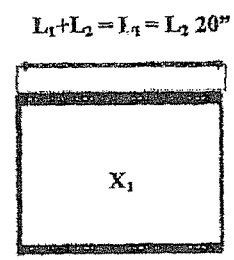

With the telescopic feature, the entire assembly can have an adjustable length as illustrated in FIGS. 10A to 10E where the length of each module is taken for example as 20". In the embodiment seen in FIG. 10A, modules $X_1$ and $X_2$ are fully opened and therefore have a combined length of $L_1+L_2=40"$, where $L_1$ and $L_2$ are lengths of modules $X_1$ and $X_2$ respectively. FIG. 10B depicts an embodiment module $X_2$ is telescoped out of module $X_1$ only slightly to attain a total length of $L_1+L_2=25"$. Whereas in FIG. 10C, module $X_2$ is telescoped out of module $X_1$ almost fully but not entirely such that the total combined length of the modules achieved is $L_1+L_2=35"$. As seen in FIG. 10D, where $L_1+L_2=29"$ or FIG. 10E where module $X_2$ is completely telescoped within module $X_1$ therefore the total length of modules $L_1+L_2=L_1=20"$. Thus the length (L) of the plenum assembly is altered by slidingly adjusting the length ($L_1$, $L_2$) of modules to achieve total coverage of distance between the cabinet 200 to the outlet wall 250 preventing presence of gaps for leakage of exhaust products leak into the said area enclosing the cabinet.

The present invention further describes a method for deflection of exhaust products during condition of arc fault. Even during these conditions, tremendous amount of heat is generated by the electrical equipments in the cabinet 200. It is imperative to allow quick passage of hot gases without any delay caused for example by opening of conventional roof flaps or vent flaps. The present invention advantageously provides the deflector plates (205, 206) inclined position to plane M-N thus allowing a continuous flow of exhaust products through the passageway (Pa, Pb, Pc). Therefore, the gases pass continuously and as and when they are generated and there is no delay in this process since the passageway (Pa, Pb, Pc) is rendered partially open due to angularly positioned deflector plates (205, 206). This is totally unlike present state of the art plenums where the deflector plates are placed at 0 degrees such that there is a delay in exhaust gases coming out from the cabinets during an arc flash leading to undesirable built up of high pressure and hot gases therewithin.

A method of preventing secondary fault during arcing in the event of an arc flash generated in any vertical section, said method comprising:
 a. Shift all resilient deflector plates to horizontal position towards the apertures to provide unobstructed path for the arc to move towards the terminal assembly.
 b. Shift immediately preceding deflector plate to vertical position away from the aperture to block entry into the preceding vertical section through the roof.
 c. Allowing all other deflector plates to remain not involved in steps (a) and (b) to remain in angular inclined position to plane M-N.

Figure 5A:
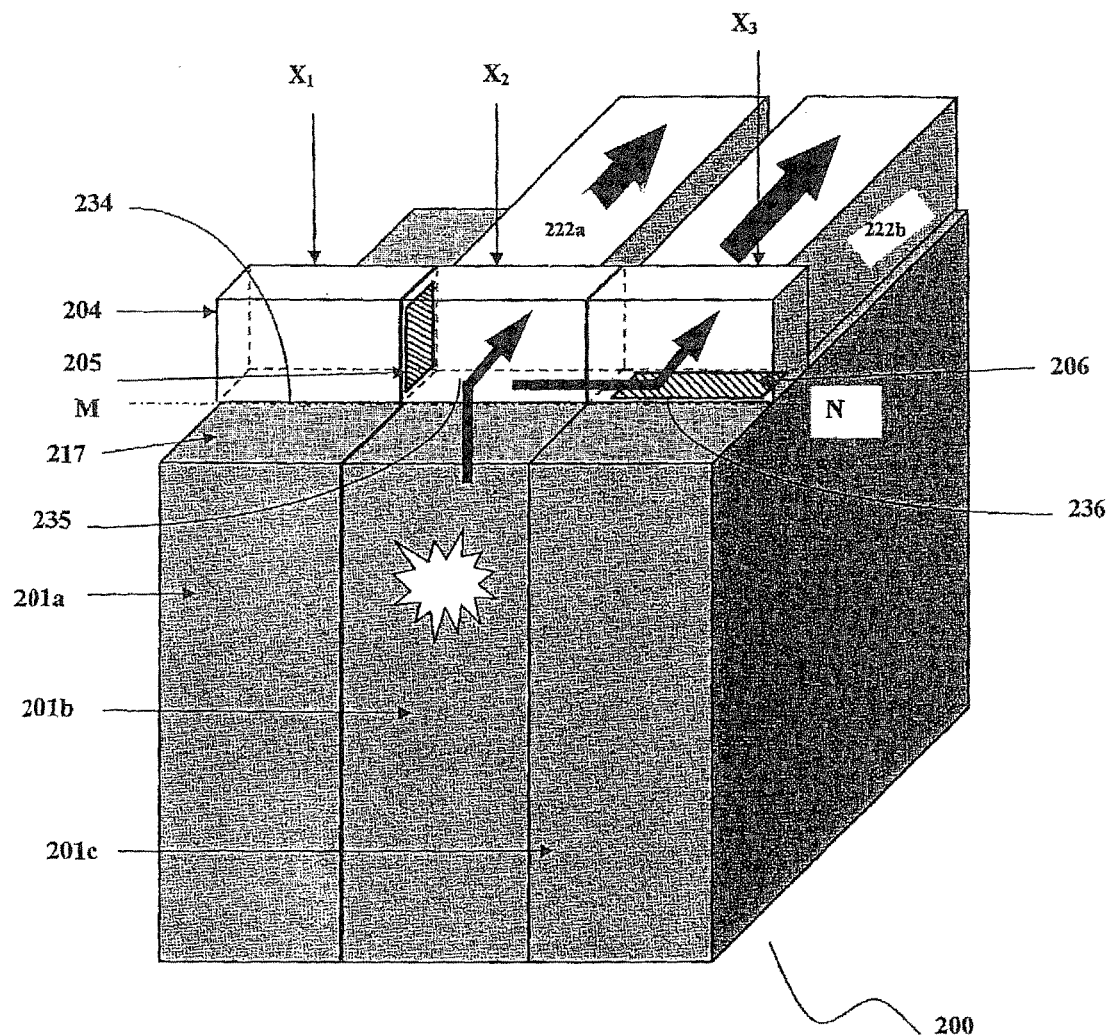
FIGS. 5A, 5B and 5C illustrate working of deflector plates in arcing conditions.

The present invention further provides for a method for preventing secondary fault during arcing conditions in which an arc flash generated in one vertical section is not allowed to eater the adjacent vertical section causing a secondary fault. For example, in case of occurrence of an arc flash in vertical section 201b as seen in FIG. 5A, the method for preventing a secondary fault during arcing conditions comprises the steps of:
 a. Pushing deflector plate 205 away from the aperture to a vertically open position i.e. 90 degrees because of high pressure exhaust gases and thus blocking the entry of the generated arc flash to vertical section 201a.
 b. Pushing deflector plate 206 towards the aperture (234, 235, 236) to horizontally closed position i.e. 0 degrees thereby blocking the entry of arc flash generated in vertical section 201b into vertical section 201c.

Therefore, in the above case the deflector plate 205 moves away from the aperture to vertical position at 90 degrees whereas the deflector plate 206 moves towards the aperture to 0 degrees. Therefore, the only path available to the arc is to move in the direction of the terminal assembly 230. Hence any deflector plate which is in the path of the arc towards terminal assembly 230 is bent to 0 degrees by the downward forces of high pressure gases.

Figure 5B:
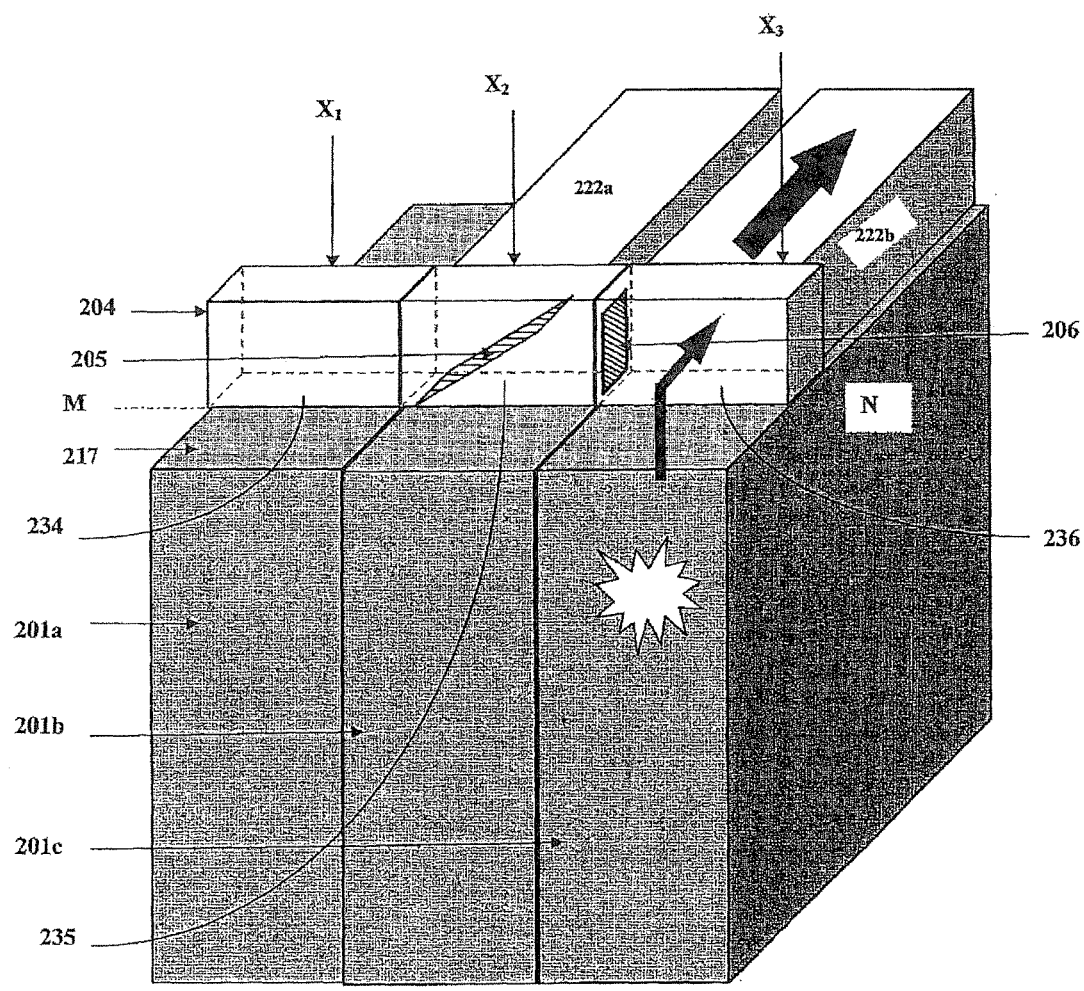

Considering another example as seen in FIG. 5B, if an arc fault occurs in vertical section 201c, the deflector plate 206 shift away from the aperture (234, 235, 236) to vertical position i.e. 90 degrees thus blocking entry to vertical section 201b whereas deflector plate 205 remains in angular position.

Figure 5C:
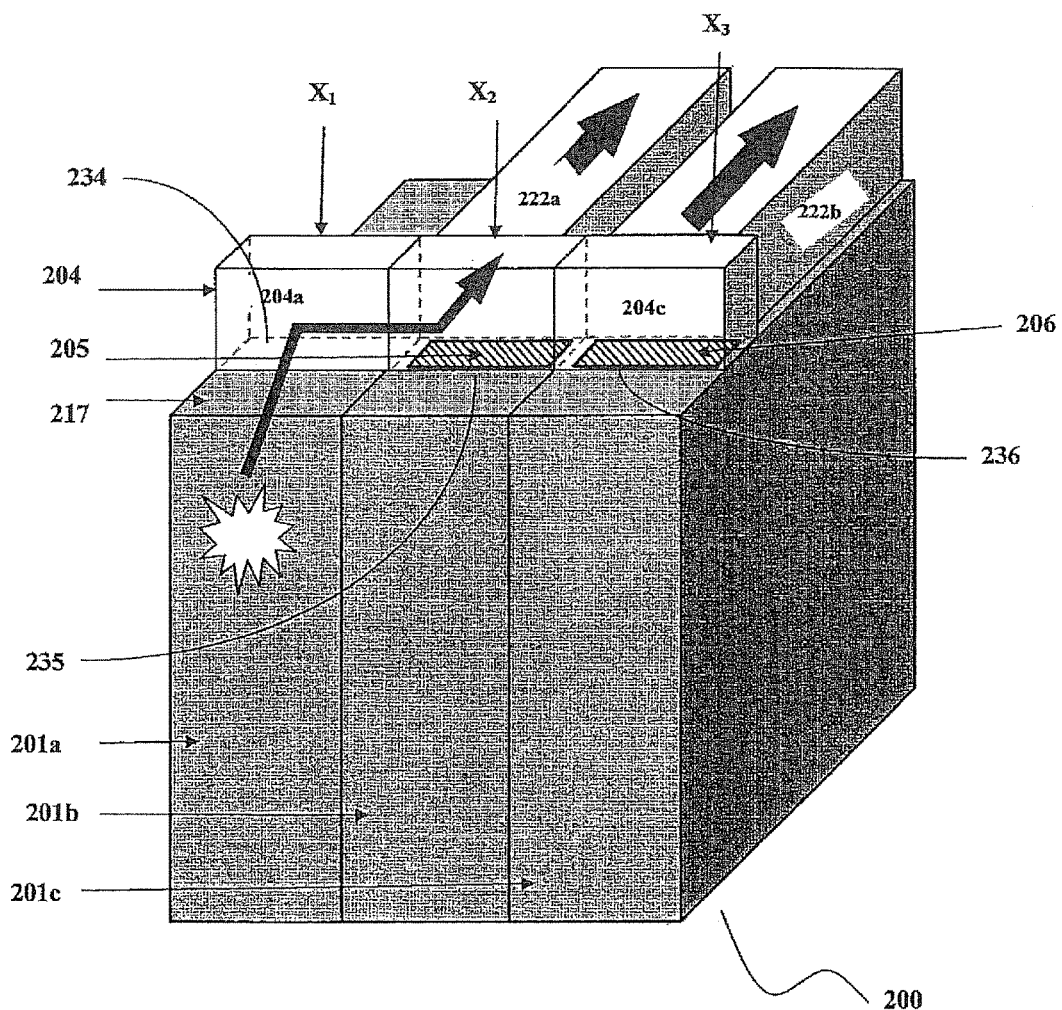

In yet another example as seen in FIG. 5C, if an arc fault occurs in vertical section 201a, the deflector plate (205, 206) both shift towards the aperture (234, 235, 236) to horizontal position i.e. 0 degrees thus blocking entry into adjacent vertical sections 201b and 201c.

Whereas deflector plate 205 is not in the path of the arc to the terminal assembly 230 and therefore remains in its normal working condition i.e. at an angular position. Thus, it restricts entry of the hot gases inside the adjacent switchgear and restricts back flow of gases. And at the same time, normal working conditions of other vertical sections of the said arc cabinet remain unaffected.

A method for full deflection of exhaust products out of the area enclosing the cabinet wherein the method comprises steps of altering the length (L) of the plenum assembly by slidingly adjusting the length ($L_1$, $L_2$) of modules to achieve total coverage of distance (Z) between the cabinet 200 to the outlet wall 250 preventing presence of gaps for leakage of exhaust products leak into the said area enclosing the cabinet.

The arc resistant cabinet 200 comprising the plenum assembly 204 of the present invention satisfies the conditions laid down in IEEE/ANSI C37.20.7 (Standard to test Internal Arcing faults for North American Market).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim:

1. A plenum assembly for coupling with an arc resistant cabinet defined by at least two vertical sections, each of the vertical sections terminating at an opening along a substantially horizontal cabinet plane defined by a top side of the cabinet, the plenum assembly comprising:
 at least one chamber including a base and a plurality of sides, the base including at least one opening for aligning with the openings of the vertical sections, and at least one of the sides including at least one opening for communicating with at least one exhaust conduit, the at least one base opening and the at least one side opening defining a pathway for exhaust products from the cabinet to the at least one exhaust conduit;
 at least one deflector plate disposed within the at least one chamber at an angular orientation with respect to the cabinet plane, the at least one deflector plate moveable from the angular orientation in response to exhaust products generated in the cabinet: and,
 at least one exhaust conduit in communication with the at least one side opening, the at least one exhaust conduit comprising a plurality of modules in accordance with: 1) the length of the plenum assembly, and 2) the distance to an outlet of an enclosure enclosing the cabinet:
 wherein the at least one chamber includes a plurality of chambers, and the at least one exhaust conduit includes a plurality of exhaust conduits, each of said exhaust conduits is connected to a corresponding said chamber, and each said exhaust conduit leads to at least one terminal assembly for deflection of exhaust products out of an area enclosing the cabinet.

2. The plenum assembly of claim 1, wherein the angular orientation of the at least deflector plate with respect to the cabinet plane is approximately 30-60 degrees.

3. The plenum assembly of claim 1, wherein the at least one deflector plate is made from at least one of thin sheet metal, mild steel and other materials imparting resiliency.

4. The plenum assembly of claim 1, wherein each of the at least one deflector plates is movable from the angular orientation such that in response to emanated high pressure exhaust gases generated during arcing conditions in the cabinet, the at least one deflector plate shifts from the angular orientation to at least one of a horizontal or vertical position with respect to the substantially horizontal cabinet plane, for preventing arc flashes generated in one vertical section from entering another vertical section through said each chamber of said plurality of chambers.

5. The plenum assembly of claim 1, wherein the modules are connected in a telescopic manner such that each module is slidingly fitted in its preceding module.

6. The plenum assembly of claim 1, wherein the length of the plenum assembly is altered by slidingly adjusting the length of modules to achieve total coverage of distance between the cabinet and a wall of an outlet, preventing the presence of gaps for leakage of exhaust products into an area enclosing the cabinet.

7. The plenum assembly of claim 1, wherein the modules are arranged in a rear exhaust configuration.

8. The plenum assembly of claim 7, additionally comprising a central conduit and wherein each exhaust conduit is in communication with the central conduit, the central conduit leading to the at least one terminal assembly.

9. The plenum assembly of claim 1, wherein the at least one terminal assembly includes a number of terminal assemblies equal to the number of exhaust conduits.

10. The plenum assembly of claim 1, wherein the modules are arranged in a lateral exhaust configuration.

11. The plenum assembly of claim 1, wherein the at least one terminal assembly comprises a terminal module.

12. The plenum assembly of claim 11, wherein the terminal module includes a flexible filter means.

13. The plenum assembly of claim 12, wherein the flexible filter means is configured for moving to a position such that the terminal module is open to allow discharge of exhaust products.

14. The plenum assembly of claim 1, wherein the at least one chamber is in communication with each of the vertical sections, such that each of the vertical sections open into the pathway.

15. A method for preventing secondary fault during arcing conditions in which an arc flash is generated in one vertical section of an electrical equipment cabinet, including at least two vertical sections, each of the vertical sections terminating at an opening along a substantially horizontal cabinet plane defined by a top side of the cabinet, comprising:

obtaining a plenum assembly comprising:

at least a first chamber and a second chamber, each of the first and second chambers including:

a base and a plurality of sides, the base including at least one opening for aligning with an opening of a vertical section of the cabinet, and at least one of the sides including at least one opening for communicating with at least one exhaust conduit, the at least one base opening and the at least one side opening defining a passageway for exhaust products from the cabinet to the at least one exhaust conduit; and, at least one deflector plate disposed within the chamber at an angular orientation with respect to the cabinet plane, the at least one deflector plate moveable from the angular orientation in response to exhaust products generated in the cabinet; and, pushing a first deflector plate in the first chamber to a vertical orientation of at least 90 degrees with respect to the cabinet plane, to block high pressure exhaust gases associated with the arcing conditions, and to block the entry of the generated arc flash, from one vertical section to the other vertical section; and, pushing a second deflector plate in the second chamber to a horizontal orientation of at least 0 degrees with respect to the cabinet plane, thereby blocking the entry of the generated arc flash in the one vertical section into the other vertical section.

\* \* \* \* \*